Figures 1, 2, 3, 4:
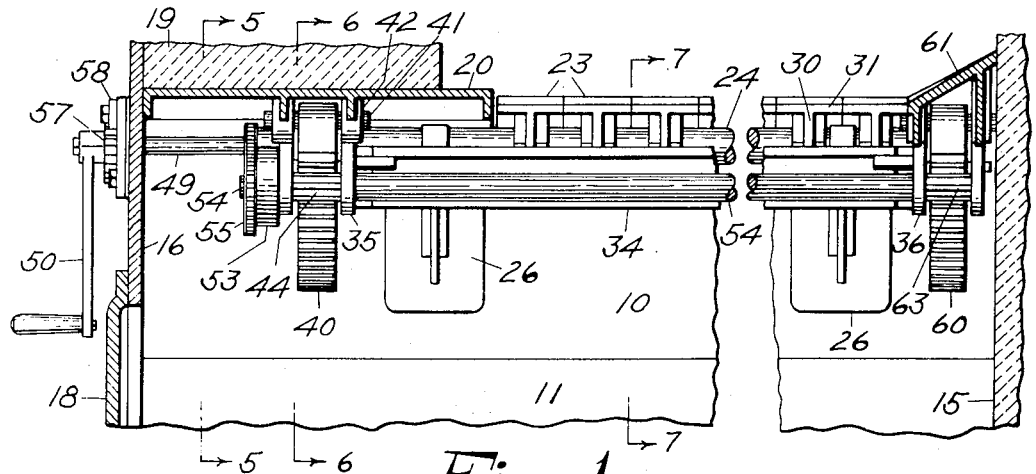

Jan. 2, 1934.    W. E. DE VOE    1,941,791
STOKER ASH DUMPING MECHANISM
Filed Feb. 6, 1931    2 Sheets-Sheet 1

INVENTOR
WILLIAM E. DeVOE
BY
Albert G. Blodgett
ATTORNEY

Jan. 2, 1934.                W. E. DE VOE                1,941,791
                     STOKER ASH DUMPING MECHANISM
                Filed Feb. 6, 1931            2 Sheets-Sheet 2

INVENTOR
WILLIAM E. DeVOE
BY
Albert G. Blodgett
ATTORNEY

Patented Jan. 2, 1934

1,941,791

UNITED STATES PATENT OFFICE 1,941,791

STOKER ASH DUMPING MECHANISM

William E. De Voe, Detroit, Mich., assignor to Riley Stoker Corporation, Worcester, Mass., a corporation of Massachusetts Application February 6, 1931. Serial No. 513,927

5 Claims. (Cl. 110—165)

This invention relates to stokers for furnaces and more particularly to a mechanism for actuating the ash dump plates of automatic stokers.

Automatic furnace stokers are frequently provided with flat plates arranged to receive the ash which results from the combustion of the fuel. These plates are usually pivotally supported and so constructed that they may be swung downwardly to dump the ash when a substantial amount has accumulated on their upper surfaces. This task of dropping the dump plates and returning them to operative position is ordinarily performed manually and is very laborious, particularly in the case of the larger stokers.

It is accordingly one object of my invention to provide an actuating mechanism for stoker ash dump plates which will require but very little power and which may be easily operated by hand.

It is a further object of my invention to provide a dump plate mechanism which will be simple and inexpensive to manufacture and capable of withstanding hard service for long periods without repairs.

With these and other objects in view, as will be apparent to those skilled in the art, my invention resides in the combination of parts set forth in the specification and covered by the claims appended hereto.

In accordance with my invention I provide a stoker dump plate which is arranged to receive the incombustible residues from the fuel burned on the stoker. This plate is so mounted that it may pivot about a substantially horizontal axis and cause the residues to drop into an ash pit or other suitable receptacle. In order to actuate the plate I provide a stationary gear and a planetary pinion in mesh therewith and I so connect the pinion to the dump plate that as the pinion revolves about the axis of the gear the dump plate will pivot about its axis, which preferably coincides with that of the gear. The planetary pinion may be driven from a manually operated shaft co-axial with the stationary gear, the preferred construction comprising a small sprocket wheel mounted on the shaft, a larger sprocket wheel connected to the pinion, and an endless chain passing around the sprockets. In the case of the larger size stokers, I may provide a stationary gear and cooperating planetary pinion at each end of the dump plate, the two pinions being in alignment and direct connected by a power transmitting shaft.

Figure 8:
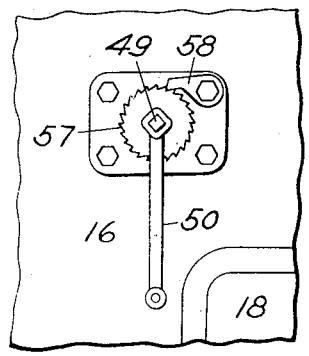
Figure 5:
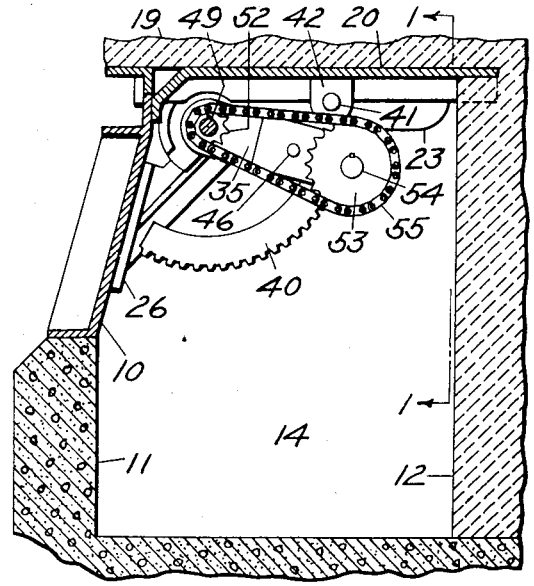
Figure 6:
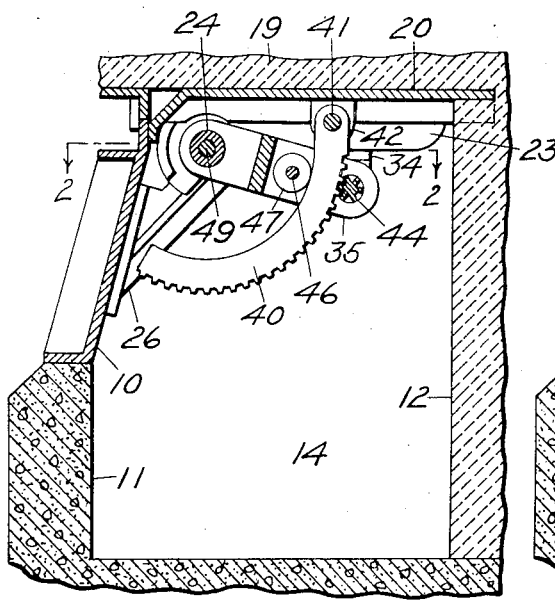
Figure 7:
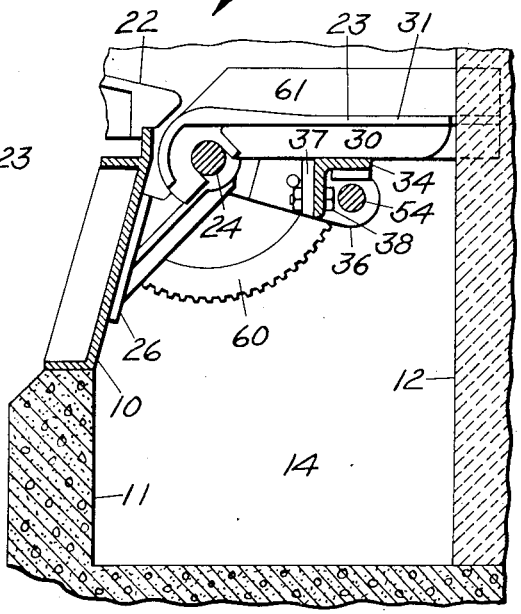

Referring to the drawings illustrating one embodiment of my invention and in which like reference numerals indicate like parts:

Fig. 1 is a section on the line 1—1 of Fig. 5;
Fig. 2 is a section on the line 2—2 of Fig. 6;
Fig. 3 is a perspective view of a supporting bracket;
Fig. 4 is a perspective view of a dump plate section;
Fig. 5 is a section on line 5—5 of Fig. 1;
Fig. 6 is a section on the line 6—6 of Fig. 1;
Fig. 7 is a section on the line 7—7 of Fig. 1; and
Fig. 8 is an elevation of a portion of the stoker front plate with certain parts of the dump operating mechanism mounted thereon.

The embodiment of the invention illustrated in the drawings is particularly arranged for a stoker of the well-known side dumping underfeed type, but only those parts are shown which are associated with the dump plate. The illustrated embodiment comprises the usual stoker side beam 10 mounted on a supporting wall 11 which is spaced from the side wall 12 of the furnace to provide an ash pit 14. This ash pit is closed at the rear by the furnace bridge wall 15 and at the front by the stoker front plate 16. The plate 16 is provided with a door 18 through which access may be had to the ash pit for the removal of ashes therefrom. The front wall 19 of the furnace is supported above the ash pit by a flat ribbed plate 20 fastened at one side to the side beam 10 and having its other side built into the side wall 12. The usual dead plates 22 (Fig. 7) are supported on the upper edge of the side beam 10 and serve to direct the incombustible residues from the fuel on to the dump plate which preferably comprises a plurality of comparatively narrow sections 23 normally extending horizontally above the ash pit 14 and close to the furnace side wall.

The dump plate sections 23 are so supported that they may be tilted when desired and thus allow the ash which has accumulated on their upper surfaces to slide off into the ash pit 14. For this purpose I provide a horizontal shaft or rod 24 arranged close to and parallel with the side beam 10. The shaft 24 is supported in brackets 26 fastened to the side beam. Each bracket as illustrated in Fig. 3, may comprise a flat plate 27 which is mounted on the side beam, and an upwardly extending U-shaped portion 28 which fits the shaft 24. In its preferred form each dump plate section is T-shaped as shown in Fig. 4, and comprises a central vertical web 30 and a horizontal flange 31 at the upper edge of the web. The web is thickened at one end of the plate and the thick portion of the web has a slot 32 therein shaped to fit the shaft 24. This slot is inclined at about 45 degrees so that the dump plate will remain in place on the shaft under the influence of gravity whether it is in its raised or lowered position. The flange 31 extends downwardly around the slot 32 to prevent ash from falling between the dump plate and the dead plates 22 when the dump plate is lowered.

I preferably provide means for supporting the other ends of the dump plate sections, and for this purpose I have illustrated a horizontal beam in the form of an angle 34 arranged parallel to the shaft 24. In its normal raised position, the angle 34 is located between the shaft 24 and the side wall 12 and has one leg extending downwardly and the other extending horizontally toward the side wall. The webs 30 of the dump plate sections rest by gravity upon the horizontal leg of the angle.

The angle 34 is arranged to be swung downwardly about the axis of the shaft 24 and for this purpose I have provided two arms 35 and 36, each having one end supported on the shaft and the other end fastened to the angle. As illustrated, each arm has a lug 37 extending laterally therefrom, and the vertical leg of the angle is attached to the lugs by means of bolts 38.

In order to control the movements of the dump plate I utilize an epicyclic gear system which preferably comprises a stationary sun gear in the form of a gear segment 40. In the embodiment illustrated this gear segment is shaped as a bar curved in the arc of a circle co-axial with the shaft 24 and provided with gear teeth which extend throughout somewhat more than 90 degrees of its outer circumference. The gear segment may be supported at its upper end by a pin 41 extending through ears 42 which depend from the plate 20. A small planetary spur pinion 44 meshes with the gear segment 40 and this pinion is arranged to roll in contact with the gear segment and at the same time raise or lower the dump plate. The arm 35 is preferably made Y-shaped, with the branches of the Y parallel and straddling the gear segment. These branches serve as bearings for the pinion 44 and also support a pin 46 on which a roller 47 is mounted. This roller contacts with the inside surface of the gear segment and holds it in proper meshing engagement with the pinion.

The pinion 44 is arranged to be actuated by manually operable means which preferably comprises a comparatively small rotatable shaft 49 extending outwardly through the front plate 16. The outer end of the shaft is square and a crank handle 50 is fitted thereon. This shaft is preferably co-axial with the dump plate supporting shaft 24, and the latter shaft is recessed at its end as shown in Fig. 2 to form a supporting bearing for the inner end of shaft 49.

Shaft 49 is connected to the pinion 44 by a suitable power transmitting means, which preferably provides for a reduction in speed and thus furnishes a mechanical advantage in the operation of the dump plate. In the illustrated embodiment, a small sprocket wheel 52 (Fig. 5) is keyed to the driving shaft 49 and a large sprocket wheel 53 is keyed to the shaft 54 of the planetary pinion. These sprocket wheels are connected by an endless power transmitting chain 55. A ratchet wheel 57 is keyed to the shaft 49 just outside the stoker front plate, and a pivotally mounted pawl 58 cooperates with the ratchet to prevent rotation of the shaft under the influence of the weight of the dump plate sections.

In order to avoid any unnecessary stress on the various parts, particularly in the case of large stokers, I preferably provide a stationary gear segment 60 at the rear of the stoker, which is a duplicate of the front segment 40. The rear segment is shown supported from a narrow rear dead plate 61 which slopes upwardly from the dump plate to the rear wall 15 and which is fastened at one end to the stoker side beam 10 and has its other end built into the side wall 12. The swinging arm 36 is preferably shaped substantially the same as the front arm 35, and straddles the rear gear segment. This arm supports a roller 62 in contact with the gear and provides bearings for a rear planetary pinion 63 which meshes with the gear. This pinion is in alignment with the front pinion 44 and directly connected thereto by the shaft 54. Both of these pinions are preferably either integral with the shaft or welded firmly to it. With this construction no shaft opening is necessary through the pinions, and a smaller number of teeth can be used.

The operation of the invention will now be apparent from the above disclosure. With the dump plate in a horizontal position as illustrated in the drawings, ash from the fuel will be deposited upon its upper surface. When a sufficient quantity has accumulated the operator will grasp the handle 50 with one hand and swing back the pawl 58 with the other hand. He will then turn the handle in a clockwise direction. The motion of the handle will be transmitted through the shaft 49, sprocket wheel 52, chain 55 and sprocket wheel 53 to the planetary pinions 44 and 63, which will be rolled downwardly along the outer surface of the gear segments 40 and 60. At the same time the pinions will carry downward with them the arms 35 and 36, the angle 34, and the dump plate sections 23. This motion is continued until the dump plate is nearly vertical and all the ash has slid therefrom into the ash pit 14. The pawl 58 is then swung back into contact with the ratchet 57 and the handle is turned in a counter-clockwise direction. This reverses the motion of all the parts and returns the dump plate to its original horizontal position. Since the sprocket wheel 52 is much smaller than the sprocket wheel 53, and since pinions 44 and 63 are much smaller than the gears with which they mesh, the dump plate can be raised very easily and with a minimum turning effort applied to the crank. By using two gear segments, both ends of the dump plate are moved evenly and excessive loading of the various parts is avoided. The construction is simple and rugged, and will operate satisfactorily throughout a long period without attention.

Having thus described my invention what I claim as new and desire to secure by Letters Patent is:

1. An ash dumping mechanism for a stoker comprising an arm pivotally supported about a substantially horizontal axis, an ash plate connected to the arm and arranged to move therewith, a stationary gear segment co-axial with the horizontal axis, a pinion rotatably mounted on the arm and in mesh with the gear segment, a manually rotatable shaft co-axial with the horizontal axis, and power transmitting means from said shaft to the pinion, whereby the pinion may be rolled along the gear segment and thus turn the ash plate about its pivot.

2. An ash dumping mechanism for a stoker comprising an arm pivotally supported about a substantially horizontal axis, an ash plate connected to the arm and arranged to move therewith, a stationary gear segment co-axial with the horizontal axis, a pinion rotatably mounted on the arm and in mesh with the gear segment, a manually rotatable shaft co-axial with the horizontal axis, a small sprocket wheel thereon, a large sprocket wheel connected to the pinion, and an endless chain connecting the sprocket wheels.

3. An ash dumping mechanism for a stoker comprising an ash plate arranged to pivot about a substantially horizontal axis, an arm at one end of the ash plate arranged to move therewith, a pinion rotatably mounted in the arm, the axis of the pinion being parallel to and spaced from the axis of the ash plate, a stationary gear segment co-axial with the horizontal axis, said gear segment having teeth in mesh with the pinion, a roller carried by the arm and serving to hold the gear segment in mesh with the pinion, and manually operable means to rotate the pinion and cause it to roll along the gear segment, thereby causing the ash plate to pivot about its axis.

4. An ash dumping mechanism for a stoker comprising a stoker side beam and a stoker front plate forming walls of an ash pit, a flat horizontal plate in the rear of the front plate, an ash plate mounted above the ash pit, a pivotal support for said ash plate mounted on the side beam whereby the plate may swing about a substantially horizontal axis, an arm beneath the horizontal plate and connected to the ash plate to pivot therewith about the horizontal axis, a stationary gear segment depending from the horizontal plate and co-axial with the pivotal support, a pinion rotatably mounted in the arm and meshing with the gear segment, a manually operable shaft co-axial with the gear segment and extending through the stoker front plate, a small sprocket wheel on said shaft, a large sprocket wheel connected directly to the pinion, and an endless chain connecting the sprocket wheels.

5. An ash dumping mechanism for a stoker comprising a substantially horizontal shaft, supporting brackets therefor, an arm near each end of the shaft, each arm having one end supported by the shaft, a horizontal beam connecting the other ends of the arms, an ash plate mounted on the shaft and beam, a supporting member above each arm, a gear segment hanging downwardly from each supporting member and co-axial with the horizontal shaft, a planetary pinion rotatably mounted on each arm and meshing with the adjacent gear segment, a common shaft for both pinions, a manually operable shaft in line with said horizontal shaft, a small sprocket wheel thereon, a large sprocket wheel on the pinion shaft, and an endless chain connecting the sprocket wheels.

WILLIAM E. DE VOE.